(12) United States Patent
Fabrykowski et al.

(10) Patent No.: US 8,909,019 B2
(45) Date of Patent: Dec. 9, 2014

(54) SYSTEM COMPRISING A PLURALITY OF DISTRIBUTION DEVICES AND DISTRIBUTION DEVICE

(71) Applicants: Grzegorz Fabrykowski, gmina Strykow (PL); Michael Müller, Menden (DE); Grzegorz Konrad Gralewski-Sek, Lodz (PL)

(72) Inventors: Grzegorz Fabrykowski, gmina Strykow (PL); Michael Müller, Menden (DE); Grzegorz Konrad Gralewski-Sek, Lodz (PL)

(73) Assignee: CCS Technology, Inc., Wilmington, DE (US)

( * ) Notice: Subject to any disclaimer, the term of this patent is extended or adjusted under 35 U.S.C. 154(b) by 6 days.

(21) Appl. No.: 13/649,377

(22) Filed: Oct. 11, 2012

(65) Prior Publication Data

US 2014/0105557 A1    Apr. 17, 2014

(51) Int. Cl.
*G02B 6/00* (2006.01)
(52) U.S. Cl.
USPC .......................................... 385/135; 385/134
(58) Field of Classification Search
USPC ................................................. 385/134–135
See application file for complete search history.

(56) References Cited

U.S. PATENT DOCUMENTS

| | | | |
|---|---|---|---|
| 1,280,393 A | 10/1918 | Cannon |
| 1,703,255 A | 2/1929 | Wagner |
| 2,003,147 A | 5/1935 | Holm-Hansen |
| 2,044,073 A | 6/1936 | Hurley |
| 2,131,408 A | 9/1938 | Murrer |
| 2,428,149 A | 9/1947 | Falk |
| 2,681,201 A | 6/1954 | Grunwald |
| 2,984,488 A | 5/1961 | Kirchner |
| 3,054,994 A | 9/1962 | Haram |
| 3,204,867 A | 9/1965 | Wahlbom |
| 3,435,124 A | 3/1969 | Channell |
| 3,880,390 A | 4/1975 | Niven |
| 4,006,540 A | 2/1977 | Lemelson |
| 4,012,010 A | 3/1977 | Friedman |
| 4,073,560 A | 2/1978 | Anhalt et al. |
| 4,123,012 A | 10/1978 | Hough |
| 4,177,961 A | 12/1979 | Gruenewald |
| 4,210,380 A | 7/1980 | Brzostek |
| D257,613 S | 12/1980 | Gruenewald |

(Continued)

FOREIGN PATENT DOCUMENTS

| | | |
|---|---|---|
| DE | 4130706 A1 | 3/1993 |
| DE | 4133375 C1 | 4/1993 |

(Continued)

OTHER PUBLICATIONS

Patent Cooperation Treaty Form ISA/210, Jul. 14, 2011, pp. 1-2.

(Continued)

*Primary Examiner* — Ellen Kim
(74) *Attorney, Agent, or Firm* — John H. Vynalek

(57) ABSTRACT

A system of distribution devices is disclosed. The housing of each distribution device has at least two physically and functionally separate functional regions. At least one first functional region is for connecting and/or storing data conductors. At least one second functional region exclusively for guiding data cables having the data conductors. When a plurality of such distribution devices are grouped next to one another and/or one above the other to form a system of a plurality of distribution devices, the functional regions which are used exclusively for guiding data cables having the data conductors form at least one cable guide channel, which extends continuously in the horizontal and/or vertical direction over a plurality of distribution devices.

12 Claims, 2 Drawing Sheets

(56) References Cited

U.S. PATENT DOCUMENTS

| | | | |
|---|---|---|---|
| 4,244,544 A | 1/1981 | Kornat | |
| 4,261,529 A | 4/1981 | Sandberg et al. | |
| 4,261,644 A | 4/1981 | Giannaris | |
| 4,480,449 A | 11/1984 | Getz et al. | |
| 4,497,457 A | 2/1985 | Harvey | |
| 4,502,754 A | 3/1985 | Kawa | |
| 4,506,698 A | 3/1985 | Garcia et al. | |
| 4,524,384 A | 6/1985 | Lefkowitz et al. | |
| D281,574 S | 12/1985 | O'Hara, II | |
| 4,579,310 A | 4/1986 | Wells et al. | |
| 4,586,675 A | 5/1986 | Brown | |
| 4,595,255 A | 6/1986 | Bhatt et al. | |
| 4,611,887 A | 9/1986 | Glover et al. | |
| 4,697,873 A | 10/1987 | Bouvard et al. | |
| 4,736,100 A | 4/1988 | Vastagh | |
| 4,747,020 A | 5/1988 | Brickley et al. | |
| 4,778,125 A | 10/1988 | Hu | |
| 4,806,814 A | 2/1989 | Nold | |
| 4,810,054 A | 3/1989 | Shinbori et al. | |
| 4,824,193 A | 4/1989 | Maeda et al. | |
| 4,836,479 A | 6/1989 | Adams | |
| 4,844,573 A | 7/1989 | Gillham et al. | |
| 4,884,863 A | 12/1989 | Throckmorton | |
| 4,900,118 A | 2/1990 | Yanagawa et al. | |
| 4,900,123 A * | 2/1990 | Barlow et al. | 385/53 |
| 4,948,220 A | 8/1990 | Violo et al. | |
| 4,961,623 A | 10/1990 | Midkiff et al. | |
| 4,979,749 A | 12/1990 | Onanian | |
| 4,995,688 A | 2/1991 | Anton et al. | |
| 5,007,701 A | 4/1991 | Roberts | |
| 5,023,646 A | 6/1991 | Ishida et al. | |
| 5,048,916 A | 9/1991 | Caron | |
| 5,048,926 A | 9/1991 | Tanimoto | |
| 5,066,149 A | 11/1991 | Wheeler et al. | |
| 5,071,211 A * | 12/1991 | Debortoli et al. | 385/76 |
| 5,071,220 A | 12/1991 | Ruello et al. | |
| 5,073,042 A | 12/1991 | Mulholland et al. | |
| 5,074,635 A | 12/1991 | Justice et al. | |
| 5,076,688 A | 12/1991 | Bowen et al. | |
| 5,085,384 A | 2/1992 | Kasubke | |
| 5,112,014 A | 5/1992 | Nichols | |
| D327,312 S | 6/1992 | Myojo | |
| 5,121,458 A | 6/1992 | Nilsson et al. | |
| 5,142,598 A | 8/1992 | Tabone | |
| D330,368 S | 10/1992 | Bourgeois et al. | |
| 5,189,410 A | 2/1993 | Kosugi et al. | |
| 5,204,929 A | 4/1993 | Machall et al. | |
| 5,209,441 A | 5/1993 | Satoh | |
| 5,210,374 A | 5/1993 | Channell | |
| 5,214,735 A | 5/1993 | Henneberger et al. | |
| 5,218,664 A | 6/1993 | O'Neill et al. | |
| 5,231,687 A | 7/1993 | Handley | |
| 5,233,674 A | 8/1993 | Vladic | |
| 5,243,679 A | 9/1993 | Sharrow et al. | |
| 5,255,161 A | 10/1993 | Knoll et al. | |
| 5,260,957 A | 11/1993 | Hakimi et al. | |
| 5,261,020 A | 11/1993 | de Jong et al. | |
| 5,265,187 A | 11/1993 | Morin et al. | |
| 5,271,585 A | 12/1993 | Zetena, Jr. | |
| 5,274,731 A | 12/1993 | White | |
| 5,287,428 A | 2/1994 | Shibata | |
| 5,317,663 A | 5/1994 | Beard et al. | |
| 5,323,480 A | 6/1994 | Mullaney et al. | |
| 5,333,221 A | 7/1994 | Briggs et al. | |
| 5,333,222 A | 7/1994 | Belenkiy et al. | |
| 5,348,240 A | 9/1994 | Carmo et al. | |
| 5,359,688 A | 10/1994 | Underwood | |
| 5,363,465 A | 11/1994 | Korkowski et al. | |
| 5,367,598 A | 11/1994 | Devenish, III et al. | |
| 5,375,185 A | 12/1994 | Hermsen et al. | |
| 5,383,051 A | 1/1995 | Delrosso et al. | |
| 5,402,515 A | 3/1995 | Vidacovich et al. | |
| 5,408,557 A | 4/1995 | Hsu | |
| RE34,955 E | 5/1995 | Anton et al. | |
| 5,420,956 A | 5/1995 | Grugel et al. | |
| 5,420,958 A | 5/1995 | Henson et al. | |
| 5,428,705 A | 6/1995 | Hermsen et al. | |
| 5,432,875 A | 7/1995 | Korkowski et al. | |
| 5,438,641 A | 8/1995 | Malacarne | |
| 5,442,726 A | 8/1995 | Howard et al. | |
| 5,448,015 A | 9/1995 | Jamet et al. | |
| 5,460,342 A | 10/1995 | Dore et al. | |
| 5,473,115 A | 12/1995 | Brownlie et al. | |
| 5,479,553 A | 12/1995 | Daems et al. | |
| 5,479,554 A | 12/1995 | Roberts | |
| 5,490,229 A * | 2/1996 | Ghandeharizadeh et al. | 385/135 |
| 5,497,444 A | 3/1996 | Wheeler | |
| 5,515,472 A | 5/1996 | Mullaney et al. | |
| 5,542,015 A | 7/1996 | Hultermans | |
| 5,548,678 A | 8/1996 | Frost et al. | |
| 5,553,183 A | 9/1996 | Bechamps | |
| 5,553,186 A | 9/1996 | Allen | |
| 5,556,060 A | 9/1996 | Bingham et al. | |
| 5,559,922 A | 9/1996 | Arnett | |
| 5,570,895 A | 11/1996 | McCue et al. | |
| 5,579,425 A | 11/1996 | Lampert et al. | |
| 5,590,234 A | 12/1996 | Pulido | |
| 5,607,126 A | 3/1997 | Cordola et al. | |
| 5,613,030 A | 3/1997 | Hoffer et al. | |
| 5,617,501 A | 4/1997 | Miller et al. | |
| 5,627,925 A | 5/1997 | Alferness et al. | |
| 5,647,043 A | 7/1997 | Anderson et al. | |
| 5,649,042 A | 7/1997 | Saito | |
| 5,652,814 A | 7/1997 | Pan et al. | |
| 5,659,655 A | 8/1997 | Pilatos | |
| 5,689,605 A | 11/1997 | Cobb et al. | |
| 5,689,607 A | 11/1997 | Vincent et al. | |
| 5,692,299 A | 12/1997 | Daems et al. | |
| 5,694,511 A | 12/1997 | Pimpinella et al. | |
| 5,708,751 A | 1/1998 | Mattei | |
| 5,717,810 A | 2/1998 | Wheeler | |
| 5,724,469 A | 3/1998 | Orlando | |
| 5,731,546 A | 3/1998 | Miles et al. | |
| 5,734,776 A | 3/1998 | Puetz | |
| 5,751,882 A | 5/1998 | Daems et al. | |
| 5,758,004 A | 5/1998 | Alarcon et al. | |
| 5,764,843 A | 6/1998 | Macken et al. | |
| 5,774,612 A | 6/1998 | Belenkiy et al. | |
| 5,775,648 A | 7/1998 | Metzger | |
| 5,778,132 A | 7/1998 | Csipkes et al. | |
| 5,781,678 A | 7/1998 | Sano et al. | |
| 5,793,920 A | 8/1998 | Wilkins et al. | |
| 5,793,921 A | 8/1998 | Wilkins et al. | |
| 5,796,908 A | 8/1998 | Vicory | |
| 5,802,237 A | 9/1998 | Pulido | |
| 5,810,461 A | 9/1998 | Ive et al. | |
| 5,816,081 A | 10/1998 | Johnston | |
| 5,823,646 A | 10/1998 | Arizpe et al. | |
| 5,825,955 A | 10/1998 | Ernst et al. | |
| 5,825,961 A | 10/1998 | Wilkins et al. | |
| 5,832,162 A | 11/1998 | Sarbell | |
| 5,835,657 A | 11/1998 | Suarez et al. | |
| 5,835,658 A | 11/1998 | Smith | |
| 5,862,290 A | 1/1999 | Burek et al. | |
| 5,867,621 A | 2/1999 | Luther et al. | |
| 5,870,519 A | 2/1999 | Jenkins et al. | |
| 5,880,864 A | 3/1999 | Williams et al. | |
| 5,881,200 A | 3/1999 | Burt | |
| 5,883,995 A | 3/1999 | Lu | |
| 5,884,003 A | 3/1999 | Cloud et al. | |
| 5,892,877 A | 4/1999 | Meyerhoefer | |
| 5,909,526 A | 6/1999 | Roth et al. | |
| 5,930,425 A | 7/1999 | Abel et al. | |
| 5,945,633 A | 8/1999 | Ott et al. | |
| 5,946,440 A | 8/1999 | Puetz | |
| 5,956,439 A | 9/1999 | Pimpinella | |
| 5,956,444 A | 9/1999 | Duda et al. | |
| 5,969,294 A | 10/1999 | Eberle et al. | |
| 5,975,769 A | 11/1999 | Larson et al. | |
| 5,978,540 A | 11/1999 | Bechamps et al. | |
| 6,009,225 A | 12/1999 | Ray et al. | |
| 6,027,252 A | 2/2000 | Erdman et al. | |
| 6,044,193 A | 3/2000 | Szentesi et al. | |
| 6,059,215 A | 5/2000 | Finnis | |

(56) References Cited

U.S. PATENT DOCUMENTS

| | | | |
|---|---|---|---|
| 6,061,492 A | 5/2000 | Strause et al. | |
| 6,065,968 A | 5/2000 | Corliss | |
| 6,079,881 A | 6/2000 | Roth | |
| D427,897 S | 7/2000 | Johnston et al. | |
| 6,118,075 A | 9/2000 | Baker et al. | |
| 6,129,221 A | 10/2000 | Shaha | |
| 6,149,315 A | 11/2000 | Stephenson | |
| 6,151,436 A | 11/2000 | Burek et al. | |
| 6,160,946 A | 12/2000 | Thompson et al. | |
| D436,027 S | 1/2001 | Johnston et al. | |
| 6,175,079 B1 | 1/2001 | Johnston et al. | |
| 6,188,687 B1 | 2/2001 | Mussman et al. | |
| 6,188,825 B1 | 2/2001 | Bandy et al. | |
| 6,192,180 B1 | 2/2001 | Kim et al. | |
| 6,208,796 B1 | 3/2001 | Williams Vigliaturo | |
| 6,215,938 B1 | 4/2001 | Reitmeier et al. | |
| 6,226,111 B1 | 5/2001 | Chang et al. | |
| 6,227,717 B1 | 5/2001 | Ott et al. | |
| 6,234,683 B1 | 5/2001 | Waldron et al. | |
| 6,236,795 B1 | 5/2001 | Rodgers | |
| 6,240,229 B1 | 5/2001 | Roth | |
| 6,243,526 B1 | 6/2001 | Garibay et al. | |
| 6,245,998 B1 | 6/2001 | Curry et al. | 174/72 A |
| 6,259,851 B1 | 7/2001 | Daoud | |
| 6,263,136 B1 | 7/2001 | Jennings et al. | |
| 6,263,141 B1 | 7/2001 | Smith | |
| 6,269,212 B1 | 7/2001 | Schiattone | |
| 6,275,640 B1 | 8/2001 | Hunsinger et al. | |
| 6,275,641 B1 | 8/2001 | Daoud | |
| 6,278,829 B1 | 8/2001 | Buabbud et al. | |
| 6,278,831 B1 | 8/2001 | Henderson et al. | |
| 6,289,159 B1 | 9/2001 | Van Hees et al. | |
| 6,292,614 B1 | 9/2001 | Smith et al. | |
| 6,304,707 B1 | 10/2001 | Daems et al. | |
| 6,307,997 B1 | 10/2001 | Walters et al. | |
| 6,307,998 B2 | 10/2001 | Williams Vigliaturo | |
| 6,311,007 B1 | 10/2001 | Daoud | |
| RE37,489 E | 1/2002 | Anton et al. | |
| 6,343,313 B1 | 1/2002 | Salesky et al. | |
| 6,347,888 B1 | 2/2002 | Puetz | |
| 6,353,697 B1 | 3/2002 | Daoud | |
| 6,359,228 B1 | 3/2002 | Strause et al. | |
| 6,363,183 B1 | 3/2002 | Koh | |
| 6,363,200 B1 | 3/2002 | Thompson et al. | |
| 6,370,294 B1 | 4/2002 | Pfeiffer et al. | |
| 6,385,381 B1 | 5/2002 | Janus et al. | |
| 6,397,166 B1 | 5/2002 | Leung et al. | |
| 6,411,767 B1 | 6/2002 | Burrous et al. | |
| 6,418,262 B1 | 7/2002 | Puetz et al. | |
| 6,424,781 B1 | 7/2002 | Puetz et al. | |
| 6,424,782 B1 | 7/2002 | Ray | |
| 6,425,694 B1 | 7/2002 | Szilagyi et al. | |
| 6,427,035 B1 | 7/2002 | Mahony | |
| 6,431,762 B1 | 8/2002 | Taira et al. | |
| 6,434,313 B1 | 8/2002 | Clapp, Jr. et al. | |
| 6,434,316 B1 | 8/2002 | Grois et al. | |
| 6,438,310 B1 | 8/2002 | Lance et al. | |
| 6,439,780 B1 | 8/2002 | Mudd et al. | |
| D463,253 S | 9/2002 | Canty | |
| 6,452,925 B1 | 9/2002 | Sistanizadeh et al. | |
| 6,456,772 B1 | 9/2002 | Daoud | |
| 6,464,402 B1 | 10/2002 | Andrews et al. | |
| D466,087 S * | 11/2002 | Cuny et al. | D13/152 |
| 6,480,487 B1 | 11/2002 | Wegleitner et al. | |
| 6,480,660 B1 | 11/2002 | Reitmeier et al. | |
| 6,483,977 B2 | 11/2002 | Battey et al. | |
| 6,484,991 B2 | 11/2002 | Sher | |
| 6,496,640 B1 | 12/2002 | Harvey et al. | |
| 6,499,608 B1 | 12/2002 | Sterling et al. | |
| D468,996 S | 1/2003 | Sarkinen et al. | |
| 6,507,691 B1 | 1/2003 | Hunsinger et al. | |
| 6,522,814 B2 | 2/2003 | Yoshida et al. | |
| 6,532,332 B2 | 3/2003 | Solheid et al. | |
| 6,535,682 B1 | 3/2003 | Puetz et al. | |
| 6,539,155 B1 | 3/2003 | Broeng et al. | |
| 6,539,160 B2 | 3/2003 | Battey et al. | |
| 6,542,652 B1 | 4/2003 | Mahony | |
| 6,542,688 B1 * | 4/2003 | Battey et al. | 385/135 |
| 6,543,100 B1 | 4/2003 | Finley et al. | |
| 6,554,485 B1 | 4/2003 | Beatty et al. | |
| 6,556,738 B2 | 4/2003 | Pfeiffer et al. | |
| 6,556,763 B1 | 4/2003 | Puetz et al. | |
| 6,567,601 B2 | 5/2003 | Daoud et al. | |
| 6,571,047 B1 | 5/2003 | Yarkosky et al. | |
| 6,577,595 B1 | 6/2003 | Counterman | |
| 6,577,801 B2 | 6/2003 | Broderick et al. | |
| 6,579,014 B2 | 6/2003 | Melton et al. | |
| 6,580,867 B2 | 6/2003 | Galaj et al. | |
| 6,581,788 B1 | 6/2003 | Winig et al. | |
| 6,591,051 B2 * | 7/2003 | Solheid et al. | 385/134 |
| 6,594,434 B1 | 7/2003 | Davidson et al. | |
| 6,597,670 B1 | 7/2003 | Tweedy et al. | |
| 6,598,949 B2 | 7/2003 | Frazier et al. | |
| 6,612,515 B1 | 9/2003 | Tinucci et al. | |
| 6,614,953 B2 | 9/2003 | Strasser et al. | |
| 6,614,974 B2 | 9/2003 | Elrefaie et al. | |
| 6,614,980 B1 | 9/2003 | Mahony | |
| 6,621,952 B1 | 9/2003 | Pi et al. | |
| 6,621,975 B2 | 9/2003 | Laporte et al. | |
| 6,625,374 B2 * | 9/2003 | Holman et al. | 385/135 |
| 6,625,375 B1 | 9/2003 | Mahony | |
| 6,631,237 B2 | 10/2003 | Knudsen et al. | |
| 6,633,717 B1 | 10/2003 | Knight et al. | |
| 6,640,028 B1 | 10/2003 | Schroll et al. | |
| RE38,311 E | 11/2003 | Wheeler | |
| 6,652,163 B2 | 11/2003 | Fajardo et al. | |
| 6,654,536 B2 | 11/2003 | Battey et al. | |
| 6,668,127 B1 | 12/2003 | Mahony | |
| 6,710,366 B1 | 3/2004 | Lee et al. | |
| 6,711,339 B2 | 3/2004 | Puetz et al. | |
| 6,715,619 B2 | 4/2004 | Kim et al. | |
| 6,741,784 B1 | 5/2004 | Guan | |
| D491,286 S | 6/2004 | Winig et al. | |
| D491,287 S | 6/2004 | Winig et al. | |
| D491,449 S | 6/2004 | Winig et al. | |
| 6,748,155 B2 | 6/2004 | Kim et al. | |
| 6,760,531 B1 | 7/2004 | Solheid et al. | |
| 6,766,094 B2 | 7/2004 | Smith et al. | |
| D495,067 S | 8/2004 | Winig et al. | |
| 6,778,752 B2 | 8/2004 | Laporte et al. | |
| 6,792,191 B1 | 9/2004 | Clapp, Jr. et al. | |
| 6,795,633 B2 | 9/2004 | Joseph, II | |
| 6,801,695 B2 | 10/2004 | Lanier et al. | |
| 6,802,724 B1 | 10/2004 | Mahony | |
| 6,804,447 B2 * | 10/2004 | Smith et al. | 385/134 |
| 6,809,258 B1 | 10/2004 | Dang et al. | |
| D498,005 S | 11/2004 | Winig et al. | |
| 6,816,661 B1 | 11/2004 | Barnes et al. | |
| 6,819,856 B2 | 11/2004 | Dagley et al. | |
| 6,819,857 B2 * | 11/2004 | Douglas et al. | 385/135 |
| 6,845,207 B2 | 1/2005 | Schray et al. | |
| 6,850,685 B2 | 2/2005 | Tinucci et al. | |
| 6,865,334 B2 | 3/2005 | Cooke et al. | |
| 6,870,734 B2 | 3/2005 | Mertesdorf et al. | |
| 6,870,997 B2 | 3/2005 | Cooke et al. | |
| 6,879,545 B2 | 4/2005 | Cooke et al. | |
| 6,880,982 B2 | 4/2005 | Imamura | |
| 6,885,798 B2 | 4/2005 | Zimmel | |
| 6,915,058 B2 | 7/2005 | Pons | |
| 6,915,059 B2 | 7/2005 | Daoud et al. | |
| 6,920,273 B2 | 7/2005 | Knudsen | |
| 6,920,274 B2 | 7/2005 | Rapp et al. | |
| 6,925,241 B2 | 8/2005 | Bohle et al. | |
| 6,925,852 B2 | 8/2005 | Susko | |
| 6,932,514 B2 | 8/2005 | Anderson et al. | |
| 6,934,451 B2 | 8/2005 | Cooke et al. | |
| 6,937,807 B2 * | 8/2005 | Franklin et al. | 385/134 |
| 6,946,605 B2 | 9/2005 | Levesque et al. | |
| 6,968,107 B2 | 11/2005 | Belardi et al. | |
| 6,983,095 B2 | 1/2006 | Reagan et al. | |
| 6,986,608 B2 | 1/2006 | Choudhury et al. | |
| 6,993,228 B2 | 1/2006 | Burke, Jr. et al. | |
| 7,006,748 B2 | 2/2006 | Dagley et al. | |
| 7,027,695 B2 | 4/2006 | Cooke et al. | |

(56) References Cited

U.S. PATENT DOCUMENTS

| | | |
|---|---|---|
| 7,054,513 B2 | 5/2006 | Hertz et al. |
| 7,068,907 B2 | 6/2006 | Schray |
| 7,083,051 B2 | 8/2006 | Smith et al. |
| 7,088,891 B2 | 8/2006 | Jung et al. |
| 7,110,654 B2 | 9/2006 | Dillat |
| 7,120,347 B2 | 10/2006 | Blackwell, Jr. et al. |
| 7,128,470 B2 | 10/2006 | Scherer et al. |
| 7,130,519 B2 | 10/2006 | Grubish et al. |
| 7,142,763 B2 | 11/2006 | Frohlich et al. |
| 7,142,764 B2 | 11/2006 | Allen et al. |
| 7,155,106 B2 | 12/2006 | Cianciotto et al. |
| 7,171,121 B1 | 1/2007 | Skarica et al. |
| 7,181,142 B1 | 2/2007 | Xu et al. |
| 7,200,316 B2 | 4/2007 | Giraud et al. |
| 7,200,317 B2 | 4/2007 | Reagan et al. |
| 7,201,595 B1 | 4/2007 | Morello |
| 7,215,865 B2 | 5/2007 | Bellekens et al. |
| 7,218,828 B2 | 5/2007 | Feustel et al. |
| 7,245,811 B2 | 7/2007 | Takeda et al. |
| 7,260,302 B2 | 8/2007 | Caveney |
| 7,264,402 B2 | 9/2007 | Theuerkorn et al. |
| 7,266,283 B2 | 9/2007 | Kline et al. |
| 7,272,291 B2 | 9/2007 | Bayazit et al. |
| 7,274,852 B1 | 9/2007 | Smrha et al. |
| 7,280,733 B2 | 10/2007 | Larson et al. |
| 7,289,731 B2 | 10/2007 | Thinguldstad |
| 7,298,951 B2 | 11/2007 | Smrha et al. |
| 7,302,153 B2 | 11/2007 | Thom |
| 7,310,471 B2 | 12/2007 | Bayazit et al. |
| 7,330,629 B2 | 2/2008 | Cooke et al. |
| 7,331,722 B2 | 2/2008 | Tan |
| 7,349,616 B1 | 3/2008 | Castonguay et al. |
| 7,369,741 B2 | 5/2008 | Reagan et al. |
| 7,376,325 B1 | 5/2008 | Cloud et al. |
| 7,379,650 B2 | 5/2008 | Weinert et al. |
| 7,406,241 B1 | 7/2008 | Opaluch et al. |
| 7,412,145 B2 | 8/2008 | Honma et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,450,806 B2 | 11/2008 | Bookbinder et al. |
| 7,460,757 B2 | 12/2008 | Hoehne et al. |
| 7,471,867 B2 | 12/2008 | Vogel et al. |
| 7,477,826 B2 | 1/2009 | Mullaney et al. |
| 7,509,016 B2 | 3/2009 | Smith et al. |
| 7,522,805 B2 | 4/2009 | Smith et al. |
| 7,526,174 B2 | 4/2009 | Leon et al. |
| 7,609,967 B2 | 10/2009 | Hochbaum et al. |
| 7,613,376 B2 | 11/2009 | Wright et al. |
| 7,636,507 B2 | 12/2009 | Lu et al. |
| 7,664,361 B2 * | 2/2010 | Trebesch et al. ............ 385/135 |
| 7,690,848 B2 | 4/2010 | Faika et al. |
| 7,766,732 B2 | 8/2010 | Hauville |
| 7,769,265 B2 | 8/2010 | Cairns |
| 7,822,310 B2 * | 10/2010 | Castonguay et al. ........ 385/135 |
| 7,889,961 B2 * | 2/2011 | Cote et al. .................... 385/135 |
| 7,970,249 B2 | 6/2011 | Solheid et al. |
| 7,974,509 B2 | 7/2011 | Smith et al. |
| 8,086,085 B2 | 12/2011 | Lu et al. |
| 8,265,447 B2 | 9/2012 | Loeffelholz et al. |
| 8,351,754 B2 | 1/2013 | Bell |
| 8,380,036 B2 | 2/2013 | Smith |
| 8,437,595 B2 | 5/2013 | Womack et al. |
| 8,465,317 B2 | 6/2013 | Gniadek et al. |
| 8,467,651 B2 * | 6/2013 | Cao et al. .................... 385/135 |
| 8,712,206 B2 * | 4/2014 | Cooke et al. ................. 385/135 |
| 2001/0001270 A1 | 5/2001 | Williams Vigliaturo |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0148846 A1 | 10/2002 | Luburic |
| 2002/0150372 A1 | 10/2002 | Schray |
| 2002/0180163 A1 | 12/2002 | Muller et al. |
| 2002/0181896 A1 | 12/2002 | McClellan et al. |
| 2002/0181905 A1 | 12/2002 | Yoshida et al. |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0194187 A1 | 10/2003 | Simmons et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 * | 4/2004 | Knudsen et al. ................ 211/26 |
| 2004/0081404 A1 | 4/2004 | Elliott |
| 2004/0084465 A1 | 5/2004 | Luburic |
| 2004/0109660 A1 | 6/2004 | Liberty |
| 2004/0123998 A1 | 7/2004 | Berglund et al. |
| 2004/0141692 A1 | 7/2004 | Anderson et al. |
| 2004/0146266 A1 | 7/2004 | Solheid et al. |
| 2004/0150267 A1 | 8/2004 | Ferguson |
| 2004/0175090 A1 * | 9/2004 | Vastmans et al. ............. 385/135 |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0036749 A1 | 2/2005 | Vogel et al. |
| 2005/0100301 A1 | 5/2005 | Solheid et al. |
| 2005/0123261 A1 * | 6/2005 | Bellekens et al. ............ 385/135 |
| 2005/0129379 A1 | 6/2005 | Reagan et al. |
| 2005/0135753 A1 | 6/2005 | Eigenmann et al. |
| 2005/0152306 A1 | 7/2005 | Bonnassieux et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0049941 A1 | 3/2006 | Hunter et al. |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins, II et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0127087 A1 | 6/2006 | Kasai et al. |
| 2006/0133753 A1 | 6/2006 | Nelson et al. |
| 2006/0153516 A1 | 7/2006 | Napiorkowski et al. |
| 2006/0153517 A1 | 7/2006 | Reagan et al. |
| 2006/0165364 A1 | 7/2006 | Frohlich et al. |
| 2006/0182407 A1 | 8/2006 | Caveney |
| 2006/0193590 A1 | 8/2006 | Puetz et al. |
| 2006/0210229 A1 | 9/2006 | Scadden |
| 2006/0210230 A1 | 9/2006 | Kline et al. |
| 2006/0215980 A1 | 9/2006 | Bayazit et al. |
| 2006/0251373 A1 | 11/2006 | Hodge et al. |
| 2006/0263029 A1 | 11/2006 | Mudd et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275007 A1 | 12/2006 | Livingston et al. |
| 2006/0275008 A1 | 12/2006 | Xin |
| 2006/0279423 A1 | 12/2006 | Nazari |
| 2006/0285807 A1 | 12/2006 | Lu et al. |
| 2007/0003204 A1 | 1/2007 | Makrides-Saravanos et al. |
| 2007/0003205 A1 | 1/2007 | Saravanos et al. |
| 2007/0023464 A1 | 2/2007 | Barkdoll et al. |
| 2007/0031099 A1 | 2/2007 | Herzog et al. |
| 2007/0031101 A1 | 2/2007 | Kline et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |

(56) References Cited

U.S. PATENT DOCUMENTS

| | | | |
|---|---|---|---|
| 2007/0052531 A1 | 3/2007 | Mathews et al. | |
| 2007/0104447 A1* | 5/2007 | Allen | 385/135 |
| 2007/0114339 A1 | 5/2007 | Winchester | |
| 2007/0183732 A1 | 8/2007 | Wittmeier et al. | |
| 2007/0263962 A1 | 11/2007 | Kohda | |
| 2007/0274718 A1 | 11/2007 | Bridges et al. | |
| 2008/0008437 A1 | 1/2008 | Reagan et al. | |
| 2008/0063350 A1 | 3/2008 | Trebesch et al. | |
| 2008/0085094 A1 | 4/2008 | Krampotich | |
| 2008/0131067 A1 | 6/2008 | Ugolini et al. | |
| 2008/0138026 A1 | 6/2008 | Yow et al. | |
| 2008/0145008 A1 | 6/2008 | Lewallen et al. | |
| 2008/0193091 A1 | 8/2008 | Herbst | |
| 2008/0205844 A1 | 8/2008 | Castonguay et al. | |
| 2008/0253723 A1 | 10/2008 | Stokes et al. | |
| 2008/0259928 A1 | 10/2008 | Chen et al. | |
| 2008/0292261 A1 | 11/2008 | Kowalczyk et al. | |
| 2008/0317425 A1 | 12/2008 | Smith et al. | |
| 2009/0022470 A1 | 1/2009 | Kramptotich | |
| 2009/0034929 A1 | 2/2009 | Reinhardt et al. | |
| 2009/0060440 A1 | 3/2009 | Wright et al. | |
| 2009/0097813 A1 | 4/2009 | Hill | |
| 2009/0103865 A1 | 4/2009 | Del Rosso | |
| 2009/0103878 A1 | 4/2009 | Zimmel | |
| 2009/0208210 A1 | 8/2009 | Trojer et al. | |
| 2009/0245746 A1 | 10/2009 | Krampotich et al. | |
| 2009/0252462 A1 | 10/2009 | Bonical | |
| 2009/0263122 A1 | 10/2009 | Helkey et al. | |
| 2009/0274429 A1 | 11/2009 | Krampotich et al. | |
| 2009/0297111 A1 | 12/2009 | Reagan et al. | |
| 2009/0304342 A1 | 12/2009 | Adomeit et al. | |
| 2009/0324189 A1 | 12/2009 | Hill et al. | |
| 2010/0061693 A1 | 3/2010 | Bran de Leon et al. | |
| 2010/0183274 A1 | 7/2010 | Brunet et al. | |
| 2010/0290753 A1 | 11/2010 | Tang et al. | |
| 2011/0052133 A1 | 3/2011 | Simmons et al. | |
| 2011/0097052 A1 | 4/2011 | Solheid et al. | |
| 2011/0158599 A1 | 6/2011 | Kowalczyk et al. | |
| 2012/0104145 A1 | 5/2012 | Dagley et al. | |
| 2012/0301096 A1 | 11/2012 | Badar et al. | |
| 2012/0308190 A1 | 12/2012 | Smith et al. | |
| 2013/0034333 A1 | 2/2013 | Holmberg et al. | |

FOREIGN PATENT DOCUMENTS

| | | | | |
|---|---|---|---|---|
| DE | 4240727 | C1 | 2/1994 | |
| DE | 29800194 | U1 | 3/1998 | |
| DE | 10005294 | A1 | 8/2001 | |
| DE | 10238189 | A1 | 2/2004 | |
| DE | 202004011493 | U1 | 9/2004 | |
| DE | 20320702 | U1 | 10/2005 | |
| DE | 202010009385 | U1 | 1/2006 | G02B 6/36 |
| DE | 202005018884 | U1 | 2/2006 | |
| DE | 202007012420 | U1 | 10/2007 | |
| DE | 202007000556 | U1 | 11/2007 | G02B 6/36 |
| EP | 0409390 | A2 | 1/1991 | |
| EP | 0410622 | A2 | 1/1991 | |
| EP | 0415647 | A2 | 3/1991 | |
| EP | 0490644 | A1 | 6/1992 | |
| EP | 0541820 | A1 | 5/1993 | |
| EP | 0593927 | A1 | 4/1994 | |
| EP | 0720322 | A2 | 7/1996 | |
| EP | 0725468 | A1 | 8/1996 | |
| EP | 0828356 | A2 | 3/1998 | |
| EP | 0840153 | A2 | 5/1998 | |
| EP | 0928053 | A2 | 7/1999 | |
| EP | 1107031 | A1 | 6/2001 | |
| EP | 1120674 | A1 | 8/2001 | |
| EP | 1179745 | A2 | 2/2002 | |
| EP | 1203974 | A2 | 5/2002 | |
| EP | 1316829 | A2 | 6/2003 | |
| EP | 1944635 | A2 | 7/2008 | |
| EP | 1944886 | A1 | 7/2008 | |
| EP | 2060942 | A2 | 5/2009 | G02B 6/44 |
| EP | 2141527 | A2 | 1/2010 | |
| FR | 2123728 | | 9/1972 | H05K 5/00 |
| FR | 2123728 | A5 | 9/1972 | |
| FR | 2748576 | A1 | 11/1997 | |
| GB | 2254163 | A | 9/1992 | |
| JP | 59107317 | A | 6/1984 | |
| JP | 6227312 | A | 8/1994 | |
| JP | 11125722 | A | 5/1999 | |
| JP | 11231163 | A | 8/1999 | |
| JP | 2001116968 | A | 4/2001 | |
| JP | 2004061713 | A | 2/2004 | |
| WO | 8805925 | A1 | 8/1988 | |
| WO | 8905989 | A1 | 6/1989 | |
| WO | 9507484 | A1 | 3/1995 | |
| WO | 9630791 | A1 | 10/1996 | |
| WO | 9638752 | A1 | 12/1996 | |
| WO | WO96/38752 | | 12/1996 | G02B 6/44 |
| WO | WO97/22025 | | 6/1997 | G02B 6/36 |
| WO | 9725642 | A1 | 7/1997 | |
| WO | 9736197 | A1 | 10/1997 | |
| WO | 0221186 | A1 | 3/2002 | |
| WO | 02099528 | A1 | 12/2002 | |
| WO | 03009527 | A2 | 1/2003 | |
| WO | 03093889 | A1 | 11/2003 | |
| WO | 2004086112 | A1 | 10/2004 | |
| WO | 2005020400 | A1 | 3/2005 | |
| WO | WO2005/020400 | | 3/2005 | H02G 15/007 |
| WO | 2005050277 | A2 | 6/2005 | |
| WO | 2005088373 | A1 | 9/2005 | |
| WO | 2006050505 | A1 | 5/2006 | |
| WO | 2006127457 | A1 | 11/2006 | |
| WO | 2006135524 | A3 | 12/2006 | |
| WO | 2007050515 | A1 | 5/2007 | |
| WO | 2007089682 | A2 | 8/2007 | |
| WO | WO2007/089682 | | 8/2007 | H05K 7/00 |
| WO | 2007129953 | A1 | 11/2007 | |
| WO | 2008033997 | A1 | 3/2008 | |
| WO | 2008048935 | A2 | 4/2008 | |
| WO | 2008137894 | A1 | 11/2008 | |
| WO | WO2009/029485 | A1 | 3/2009 | H04Q 1/14 |

OTHER PUBLICATIONS

Patent Cooperation Treaty Form ISA/210, Aug. 5, 2011, pp. 1-2.
Patent Cooperation Treaty Form ISA/210, Jul. 20, 2011, pp. 1-2.
Non-final Office Action for U.S. Appl. No. 13/479,846 mailed Sep. 13, 2013, 11 pages.
Non-final Office Action for U.S. Appl. No. 13/613,759 mailed Sep. 20, 2013, 10 pages.
Tanji et al., "Optical Fiber Cabling Technologies for Flexible Access Network," Optical Fiber Technology, Academic Press, London, US, vol. 14, No. 3, Jul. 1, 2008, 8 pages.
Non-final Office Action for U.S. Appl. No. 12/072,187 mailed Dec. 26, 2013, 25 pages.
Final Office Action for U.S. Appl. No. 10/804,958 mailed Mar. 11, 2014, 13 pages.
Notice of Allowance for U.S. Appl. No. 11/975,440 mailed Jan. 15, 2014, 7 pages.
Non-final Office Action for U.S. Appl. No. 13/087,765 mailed Sep. 18, 2013, 8 pages.
Final Office Action for U.S. Appl. No. 13/479,846 mailed Feb. 14, 2014, 11 pages.
Final Office Action for U.S. Appl. No. 13/613,759 mailed Jan. 27, 2014, 13 pages.
Non-final Office Action for U.S. Appl. No. 13/083,110 mailed Mar. 18, 2014, 14 pages.
Non-final Office Action for U.S. Appl. No. 13/089,692 mailed Jan. 13, 2014, 8 pages.
Non-final Office Action for U.S. Appl. No. 13/094,572 mailed Jan. 18, 2013, 17 pages.
Final Office Action for U.S. Appl. No. 13/094,572 mailed Jul. 8, 2013, 13 pages.
Advisory Action for U.S. Appl. No. 13/094,572 mailed Oct. 7, 2013, 2 pages.
Non-final Office Action for U.S. Appl. No. 13/094,572 mailed Mar. 4, 2014, 14 pages.

(56) References Cited

OTHER PUBLICATIONS

Advisory Action for U.S. Appl. No. 13/613,759 mailed Apr. 7, 2014, 3 pages.
Notice of Allowance for U.S. Appl. No. 11/595,723 mailed Dec. 28, 2010, 8 pages.
Non-final Office Action for U.S. Appl. No. 11/595,723 mailed Jun. 21, 2010, 9 pages.
Non-final Office Action for U.S. Appl. No. 11/595,723 mailed Jan. 5, 2010 9 pages.
Advisory Action for U.S. Appl. No. 11/595,723 mailed Nov. 24, 2009, 3 pages.
Final Office Action for U.S. Appl. No. 11/595,723 mailed Jul. 8, 2009, 13 pages.
Non-final Office Action for U.S. Appl. No. 11/595,723 mailed Sep. 25, 2008, 13 pages.
Final Office Action for U.S. Appl. No. 11/595,723 mailed Apr. 11, 2008, 12 pages.
Non-final Office Action for U.S. Appl. No. 11/595,723 mailed Jun. 7, 2007 18 pages.
Examiner's Answer to Appeal Brief for U.S. Appl. No. 11/975,440 mailed Oct. 22, 2010, 17 pages.
Final Office Action for U.S. Appl. No. 11/975,440 mailed Mar. 8, 2010, 10 pages.
Non-final Office Action for U.S. Appl. No. 11/975,440 mailed Oct. 28, 2009, 7 pages.
Non-final Office Action for U.S. Appl. No. 11/975,440 mailed Jul. 10, 2009, 6 pages.
Notice of Allowance for U.S. Appl. No. 12/566,191 mailed May 24, 2011, 5 pages.
Final Office Action for U.S. Appl. No. 12/566,191 mailed Feb. 15, 2011, 8 pages.
Non-Final Office Action for U.S. Appl. No. 12/566,191 mailed Sep. 30, 2010, 8 pages.
Monro et al., "Holey Fibers with random cladding distributions," Optic Letters, vol. 25, No. 4, Feb. 15, 2000, 3 pages.
Notice of Allowance for U.S. Appl. No. 11/499,572 mailed Jul. 1, 2010, 7 pages.
Advisory Action for U.S. Appl. No. 11/499,572 mailed Jan. 27, 2010, 3 pages.
Final Office Action for U.S. Appl. No. 11/499,572 mailed Aug. 12, 2009, 9 pages.
Advisory Action for U.S. Appl. No. 11/499,572 mailed May 29, 2009, 3 pages.
Final Office Action for U.S. Appl. No. 11/499,572 mailed Dec. 26, 2008, 8 pages.
Non-final Office Action for U.S. Appl. No. 11/499,572 mailed Jun. 13, 2008, 7 pages.
Notice of Allowance for U.S. Appl. No. 12/012,144 mailed Feb. 10, 2009, 6 pages.
Non-final Office Action for U.S. Appl. No. 12/012,144 mailed Jul. 15, 2008, 5 pages.
Notice of Allowance for U.S. Appl. No. 11/712,168 mailed Apr. 21, 2010, 9 pages.
Notice of Allowance for U.S. Appl. No. 11/712,168 mailed Sep. 18, 2009, 9 pages.
Notice of Allowance for U.S. Appl. No. 11/712,168 mailed Jun. 1, 2009, 7 pages.
Notice of Allowance for U.S. Appl. No. 11/712,168 mailed Apr. 7, 2009, 9 pages.
Advisory Action for U.S. Appl. No. 11/712,168 mailed Oct. 20, 2008, 3 pages.
Final Office Action for U.S. Appl. No. 11/712,168 mailed Jul. 24, 2008, 11 pages.
Non-final Office Action for U.S. Appl. No. 11/712,168 mailed Oct. 9, 2007, 7 pages.
Advisory Action for U.S. Appl. No. 11/809,390 mailed Dec. 14, 2009, 2 pages.
Final Office Action for U.S. Appl. No. 11/809,390 mailed Sep. 25, 2009, 12 pages.
Non-final Office Action for U.S. Appl. No. 11/809,390 mailed Mar. 11, 2009, 9 pages.
Notice of Allowance for U.S. Appl. No. 11/809,390 mailed Nov. 18, 2008, 7 pages.
Non-final Office Action for U.S. Appl. No. 11/809,390 mailed Jul. 25, 2008, 10 pages.
Non-final Office Action for U.S. Appl. No. 11/439,070 mailed Jun. 17, 2009, 9 pages.
Non-final Office Action for U.S. Appl. No. 11/439,070 mailed Oct. 17, 2008, 13 pages.
Non-final Office Action for U.S. Appl. No. 11/439,070 mailed Jan. 11, 2008, 11 pages.
Non-final Office Action for U.S. Appl. No. 11/439,070 mailed May 16, 2007, 16 pages.
Final Office Action for U.S. Appl. No. 12/229,810 mailed Jun. 9, 2011, 16 pages.
Non-final Office Action for U.S. Appl. No. 12/229,810 mailed Dec. 23, 2010, 16 pages.
Final Office Action for U.S. Appl. No. 13/083,110 mailed Aug. 5, 2013, 13 pages.
Notice of Allowance for U.S. Appl. No. 12/417,250 mailed Nov. 9, 2011, 8 pages.
Decision on Appeal for U.S. Appl. No. 11/975,440 mailed Nov. 4, 2013, 10 pages.
Advisory Action for U.S. Appl. No. 13/083,110 mailed Nov. 12, 2013, 3 pages.
Advisory Action for U.S. Appl. No. 13/275,798 mailed Sep. 12, 2013, 2 pages.
Non-final Office Action for U.S. Appl. No. 12/417,250 mailed Jun. 23, 2011, 9 pages.
Final Office Action for U.S. Appl. No. 12/417,250 mailed Mar. 3, 2011, 9 pages.
Non-final Office Action for U.S. Appl. No. 12/417,250 mailed Jul. 27, 2010, 11 pages.
Advisory Action for U.S. Appl. No. 12/697,628 mailed Mar. 1, 2012, 3 pages.
Final Office Action for U.S. Appl. No. 12/697,628 mailed Nov. 17, 2011, 15 pages.
Non-final Office Action for U.S. Appl. No. 12/697,628 mailed Apr. 6, 2011, 11 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Quayle Action for U.S. Appl. No. 12/861,345 mailed Apr. 9, 2012, 6 pages.
Non-final Office Action for U.S. Appl. No. 12/861,345 mailed Dec. 15, 2011, 10 pages.
Non-final Office Action for U.S. Appl. No. 12/700,837 mailed Jan. 30, 2012, 7 pages.
Final Office Action for U.S. Appl. No. 12/474,866 mailed Jan. 31, 2012, 8 pages.
Non-final Office Action for U.S. Appl. No. 12/474,866 mailed Aug. 5, 2011, 9 pages.
International Search Report for PCT/US2009/066779, Aug. 27, 2010, 3 pages.
International Search Report for PCT/EP2009/000929, Apr. 27, 2009, 4 pages.
Final Office Action for U.S. Appl. No. 12/700,837 mailed Aug. 31, 2012, 10 pages.
International Search Report for PCT/US2007/023631, mailed Apr. 21, 2008, 2 pages.
International Search Report for PCT/US2008/000095 mailed Sep. 12, 2008, 5 pages.
International Search Report for PCT/US2008/002514 mailed Aug. 8, 2008, 2 pages.
International Search Report for PCT/US2008/006798 mailed Oct. 1, 2008, 2 pages.
Advisory Action for U.S. Appl. No. 12/072,187 mailed Aug. 15, 2011, 2 pages.
Final Office Action for U.S. Appl. No. 12/072,187 mailed Jun. 13, 2011, 21 pages.

(56) References Cited

OTHER PUBLICATIONS

Non-final Office Action for U.S. Appl. No. 12/072,187 mailed Nov. 30, 2010, 17 pages.
Non-final Office Action for U.S. Appl. No. 12/892,280 mailed Nov. 6, 2012, 4 pages.
Non-final Office Action for U.S. Appl. No. 13/083,110 mailed Dec. 12, 2012, 9 pages.
International Search Report for PCT/US2009/057140 mailed Nov. 9, 2009, 2 pages.
Examiner's Answer to Appeal Brief for U.S. Appl. No. 12/323,385 mailed Feb. 21, 2013, 11 pages.
Final Office Action for U.S. Appl. No. 12/625,341 mailed Feb. 12, 2013, 10 pages.
Advisory Action for U.S. Appl. No. 12/625,341 mailed Apr. 25, 2013, 6 pages.
Non-final Office Action for U.S. Appl. No. 12/625,341 mailed Oct. 16, 2012, 8 pages.
Non-final Office Action for U.S. Appl. No. 12/323,385 mailed Sep. 21, 2011, 10 pages.
Final Office Action for U.S. Appl. No. 12/323,385 mailed Mar. 6, 2012, 12 pages.
Final Office Action for U.S. Appl. No. 12/751,860 mailed Nov. 5, 2012, 6 pages.
Non-final Office Action for U.S. Appl. No. 12/751,860 mailed Jul. 18, 2012, 8 pages.
Final Office Action for U.S. Appl. No. 13/275,798 mailed Jun. 27, 2013, 10 pages.
Non-final Office Action for U.S. Appl. No. 13/275,798 mailed Mar. 1, 2013, 8 pages.
Final Office Action for U.S. Appl. No. 13/177,233 mailed Mar. 29, 2013, 9 pages.
Advisory Action for U.S. Appl. No. 13/177,233 mailed Jul. 17, 2013, 3 pages.
Non-final Office Action for U.S. Appl. No. 13/177,233 mailed Dec. 17, 2012, 7 pages.
Non-final Office Action for U.S. Appl. No. 10/804,958 mailed Jul. 22, 2009, 8 pages.
Final Office Action for U.S. Appl. No. 10/804,958 mailed Jun. 11, 2008, 9 pages.
Non-final Office Action for U.S. Appl. No. 10/804,958 mailed Aug. 30, 2013, 11 pages.
Notice of Allowance for U.S. Appl. No. 10/804,958 mailed May 24, 2013, 8 pages.
Decision on Appeal for U.S. Appl. No. 10/804,958 mailed Apr. 18, 2013, 9 pages.
Examiner's Answer to Appeal Brief for U.S. Appl. No. 10/804,958 mailed Apr. 29, 2010, 12 pages.
Final Office Action for U.S. Appl. No. 10/804,958 mailed Oct. 9, 2007, 8 pages.
Non-final Office Action for U.S. Appl. No. 10/804,958 mailed Jun. 15, 2007, 7 pages.
Final Office Action for U.S. Appl. No. 10/804,958 mailed Nov. 3, 2006, 7 pages.
Non-final Office Action for U.S. Appl. No. 10/804,958 mailed Apr. 6, 2006, 7 pages.
Non-final Office Action for U.S. Appl. No. 10/804,958 mailed Sep. 21, 2005, 7 pages.
Advisory Action for U.S. Appl. No. 10/804,958 mailed Jun. 26, 2014, 4 pages.
Notice of Allowance for U.S. Appl. No. 11/975,440 mailed Apr. 30, 2014, 8 pages.
Final Office Action for U.S. Appl. No. 12/072,187 mailed May 27, 2014, 27 pages.
Non-final Office Action for U.S. Appl. No. 13/089,692 mailed May 5, 2014, 7 pages.
Advisory Action for U.S. Appl. No. 13/479,846 mailed May 8, 2014, 3 pages.
Non-final Office Action for U.S. Appl. No. 13/537,753 mailed Mar. 27, 2014, 7 pages.
Non-final Office Action for U.S. Appl. No. 13/601,245 mailed Mar. 27, 2014, 8 pages.
Final Office Action for U.S. App. No. 13/089,692 mailed Aug. 13, 2014, 8 pages.
Notice of Allowance and Interview Summary for U.S. Appl. No. 13/094,572 mailed Aug. 7, 2014, 11 pages.
Examiner's Answer to the Appeal Brief for U.S. Appl. No. 13/275,798 mailed Aug. 26, 2014, 6 pages.
Notice of Allowance for U.S. Appl. No. 13/537,753 mailed Aug. 21, 2014, 7 pages.
Examiner's Answer to the Appeal Brief for U.S. Appl. No. 13/613,759 mailed Aug. 18, 2014, 6 pages.

* cited by examiner

SYSTEM COMPRISING A PLURALITY OF DISTRIBUTION DEVICES AND DISTRIBUTION DEVICE

RELATED APPLICATIONS

This application is a continuation of International Application No. PCT/US11/30466 filed Mar. 30, 2011, which claims the benefit of priority to U.S. Application No. 61/407,721, filed Oct. 28, 2010 and U.S. Application No. 61/325,082, filed Apr. 16, 2010, all applications being incorporated herein by reference.

BACKGROUND

The present invention relates to a system comprising a plurality of distribution devices such as optical waveguide distribution devices, in particular comprising a plurality of wall-mounted distribution boards, for handling data conductors such as optical waveguides or junctions between data conductors, in accordance with the precharacterizing clause of Claim 1. Furthermore, the invention relates to a distribution device in accordance with the precharacterizing clause of Claim 12.

When constructing optical waveguide cable networks, for example, optical waveguide distribution devices are required in order to ensure structured wiring. One demand placed on such optical waveguide distribution devices is a maximum possible number of optical waveguide distribution devices fitted with a high packing density and, at the same time, a low level of mechanical stress on the optical waveguides. Similar demands are placed on distribution devices for handling other data conductors.

DE 20 2007 000 556 U1 has disclosed an optical waveguide distribution device in the form of a wall-mounted distribution board and having a housing and assemblies arranged in the housing for handling optical waveguides. The housing of the optical waveguide distribution device known from this prior art has a modular design and has a plurality of basic modules which can be connected to one another and which can be connected in a defined grid pattern in the horizontal direction and/or vertical direction in order to extend the dimensions of the housing of the optical waveguide distribution device.

EP 2 060 942 A2 has likewise disclosed an optical waveguide distribution device with a housing and assemblies accommodated in the housing for handling, namely connecting and/or storing, optical waveguides. In accordance with this prior art, a plurality of optical waveguide distribution devices can be connected to one another in order to form a system comprising a plurality of optical waveguide distribution devices.

Until now, guiding or transferring data cables in the region of the distribution devices has presented difficulties.

SUMMARY

Against this background, the present invention is based on the problem of providing a novel system comprising a plurality of distribution devices. This problem is solved by a system having the features of Claim 1. According to the invention, the housing of each distribution device has at least two physically and functionally separate functional regions, namely at least one first functional region for connecting and/or storing data conductors and one second functional region exclusively for guiding data cables having the data conductors.

The present invention proposes for the first time providing a separate functional region on a distribution device, which functional region serves the purpose exclusively of guiding data cables. A functional region which serves the purpose of connecting and/or storing data conductors guided in the data cables is separated physically and functionally from this first functional region, which serves exclusively to guide data cables. When a plurality of such distribution devices are grouped next to one another and/or one above the other to form a system of a plurality of distribution devices, the functional regions which are used exclusively for guiding data cables having the data conductors form at least one cable guide channel, which extends continuously in the horizontal and/or vertical direction over a plurality of distribution devices. Particularly preferred guidance and handling of data cables is thus possible.

Preferably, the second functional regions of distribution devices positioned next to one another or one above the other define a continuous cable guide channel, which extends over all the distribution devices positioned next to one another or one above the other, in order to transfer data cables between the distribution devices positioned next to one another or one above the other in the horizontal or vertical direction and in a manner physically separated from the first functional regions.

In accordance with an advantageous development of the invention, the first functional region and the second functional region of the housing of each distribution device are separated from one another by a side wall of a housing lower part of the respective housing, with at least one aperture for transferring the data cables having the data conductors between the two functional regions being introduced into this side wall of the housing lower part of each distribution device. By virtue of the provision of at least one aperture in the side walls of the housing lower parts, which side walls separate the first functional regions and second functional regions from one another, it is possible to transfer a data cable or the data conductors guided in the data cable from the second functional region, which is used exclusively for guiding the data cables, into the first functional region of each distribution device.

Preferably, the first functional region and the second functional region of the housing of each distribution device are covered or closed by in each case one individual cover-like housing upper part.

When the first functional regions and the second functional regions of the housings of the distribution devices are closed or covered by an individual cover-like housing upper part, individual access to the first functional regions and second functional regions of the distribution devices is possible.

As a result, it is then possible to provide a system comprising a plurality of distribution devices, in which different access rights to the first functional regions and the second functional regions of the distribution devices can be established.

BRIEF DESCRIPTION OF THE DRAWINGS

Preferred developments of the invention are given in the dependent claims and the description below. Exemplary embodiments of the invention will be explained in more detail which reference to the drawing, in which:

DETAILED DESCRIPTION

The invention relates to a system comprising a plurality of distribution devices, in particular comprising a plurality of distribution devices in the form of wall-mounted distribution boards. Furthermore, the invention relates to a distribution device as part of such a system. In the text which follows, the invention for the preferred application for optical waveguide distribution devices is described.

Figure 1:
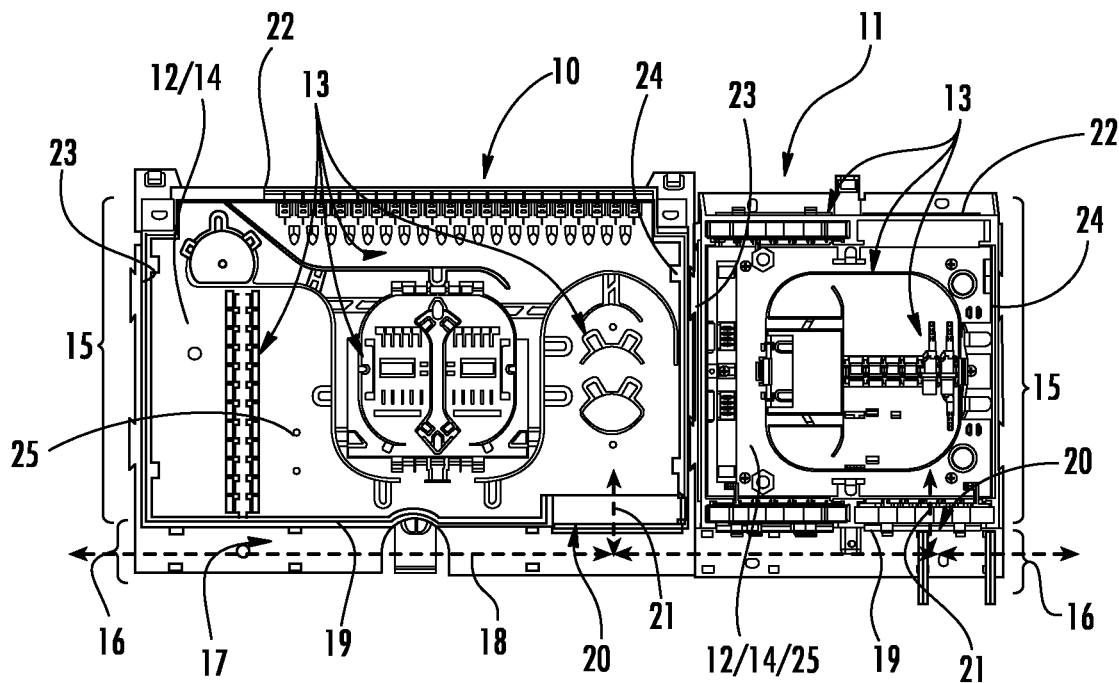
FIG. 1 shows a schematic illustration of a system according to the invention comprising a plurality of distribution devices in the form of optical waveguide distribution devices in accordance with a first exemplary embodiment of the invention.

FIG. 1 shows an exemplary embodiment of a system according to the invention comprising a plurality of optical waveguide distribution devices, with two optical waveguide distribution devices 10 and 11 being positioned next to one another in FIG. 1.

Each of the optical waveguide distribution devices 10 and 11 comprises a housing 12 and assemblies 13 accommodated in the housing 12 for connecting and/or storing optical waveguides, with only the housing lower parts, or bases, 14 of the housings 12 of the optical waveguide distribution devices 10 and 11 being shown in FIG. 1.

According to the invention, the housing 12 of each optical waveguide distribution device 10 and 11 of a system according to the invention comprising a plurality of optical waveguide distribution devices has at least two physically and functionally separate functional regions, namely at least one first functional region 15 for connecting and/or storing optical waveguides guided in optical waveguide cables and one second functional region 16 exclusively for guiding optical waveguide cables having the optical waveguides.

It can be seen from FIG. 1 that the second functional regions 16 of the optical waveguide distribution devices 10 and 11 positioned next to one another define a continuous cable guide channel 17, which extends over all of the optical waveguide distribution devices 10 and 11 positioned next to one another, in order to transfer optical waveguide cables in a horizontal direction between the optical waveguide distribution devices 10 and 11 positioned next to one another in a manner physically separate from the first functional regions 15 thereof. This transfer of the optical waveguide cables between the optical waveguide distribution devices 10 and 11 via the continuous cable guide channel 17 is illustrated in FIG. 1 by dotted arrows 18 extending in the horizontal direction.

When optical waveguide distribution devices are positioned one above the other, the second functional regions 16 thereof form a continuous cable guide channel extending in the vertical direction in order then to transfer optical waveguide cables in the vertical direction between optical waveguide distribution devices positioned one above the other.

As can be seen from FIG. 1, the first functional region 15 and the second functional region 16 of the respective housing 12 of the respective optical waveguide distribution device 10, 11 are separated from one another in the region of each optical waveguide distribution device 10 and 11 by a side wall 19 of the respective housing lower part 14, with in each case at least one aperture 20 being introduced into these side walls 19, by virtue of which the first functional regions 15 and second functional regions 16 of the optical waveguide distribution devices 10 and 11 are separated from one another, in order to transfer optical waveguides or optical waveguide cables guiding the optical waveguides between these two functional regions 14 and 15 of the optical waveguide distribution devices 10 and 11. This transfer is illustrated in FIG. 1 by vertically running, dotted arrows 21.

In addition to the side walls 19 of the housing lower parts 14 of the housings 12 of the optical waveguide distribution devices 10 and 11, which side walls separate the first functional regions 15 and the second functional regions 16 of the optical waveguide distribution devices 10 and 11 from one another, the housing lower parts 14 of the housings 12 of the optical waveguide distribution devices 10 and 11 comprise further side walls 22, 23 and 24, wherein, in the exemplary embodiment shown in FIG. 1, in which optical waveguide distribution devices 10 and 11 are positioned laterally next to one another, the first functional regions 15 of these optical waveguide distribution devices 10 and 11 positioned next to one another are separated from one another by directly adjoining side walls 23 and 24 of the adjacent optical waveguide distribution devices 10 and 11.

In the exemplary embodiment shown in FIG. 1, in which the optical waveguide distribution devices 10 and 11 are therefore positioned next to one another, the first functional regions 15 thereof are separated from one another by the side walls 23, 24, but the second functional regions 16 thereof form the continuous cable guide channel 17.

In addition to the abovementioned side walls 19, 22, 23 and 24, each housing lower part 14 of the housing 12 of each optical waveguide distribution device 10 and 11 furthermore comprises a rear wall 25, via which the respective optical waveguide distribution device 10 or 11 can be fastened on a bearing structure, for example a housing wall. The assemblies 13 for connecting and/or storing the optical waveguides are positioned on this rear wall 25 of the respective housing lower part 14 of the respective optical waveguide distribution device 10, 11.

Figure 2:
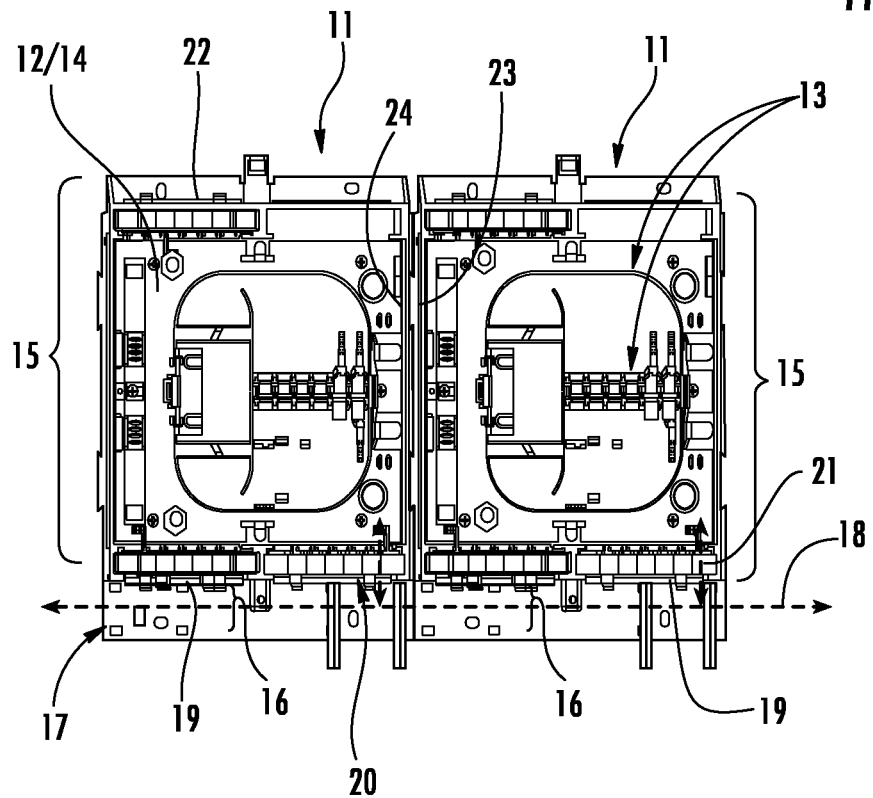
FIG. 2 shows a schematic illustration of a system according to the invention comprising a plurality of distribution devices in the form of optical waveguide distribution devices in accordance with a second exemplary embodiment of the invention.

FIG. 2 shows an embodiment of the invention in which, in turn, two optical waveguide distribution devices are positioned next to one another, but in contrast to the exemplary embodiment shown in FIG. 1, the two optical waveguide distribution devices 11 positioned next to one another are of identical design. Otherwise, there are no differences, with the result that reference is made to the statements above so as to avoid unnecessary repetition.

Figure 3:
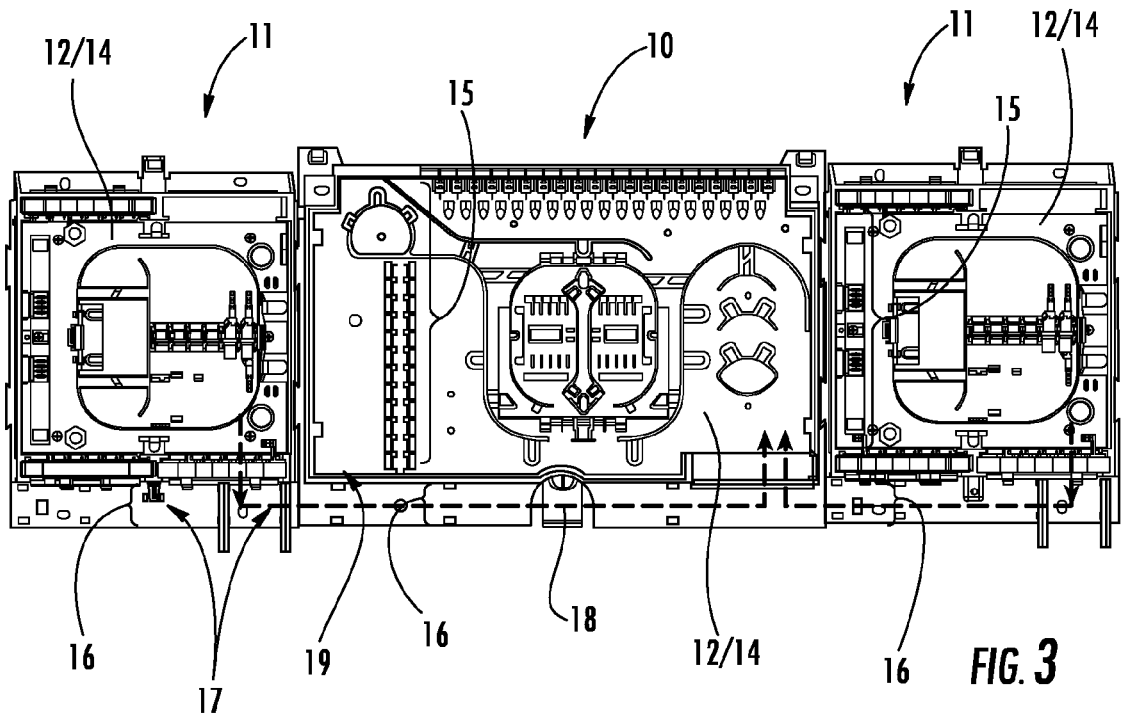
FIG. 3 shows a schematic illustration of a system according to the invention comprising a plurality of distribution devices in the form of optical waveguide distribution devices in accordance with a third exemplary embodiment of the invention.

In the exemplary embodiment shown in FIG. 3, a system comprising a plurality of optical waveguide distribution devices is shown which comprises three optical waveguide distribution devices 10 and 11 positioned next to one another, namely the optical waveguide distribution device 10 shown in FIG. 1 and, to the left and right of this, identical optical waveguide distribution devices 11. In this case too, the only difference is the number of optical waveguide distribution devices provided or positioned next to one another, with the result that reference is again made to the exemplary embodiment shown in FIG. 1 so as to avoid unnecessary repetition.

It is therefore part of the present invention to propose a system comprising a plurality of optical waveguide distribution devices, wherein each optical waveguide distribution device comprises at least the two functional regions 15 and 16.

When optical waveguide distribution devices having the functional regions 15 and 16 are positioned next to one another and/or one above the other, the first functional regions 15 of the optical waveguide distribution devices 10, 11 positioned next to one another and/or one above the other are separated from one another in each case by side walls of the housing lower parts 14; the second functional regions 16 thereof form continuous cable guide channels 17.

In addition to the housing lower parts 14, each optical waveguide distribution device 10, 11 comprises at least one cover-like housing upper part, or cover.

In accordance with a first advantageous development of the invention, it is proposed that the first functional region 15 and the second functional region 16 of the housing 12 or housing lower part 14 of each optical waveguide distribution device 10, 11 is closed or covered by a common cover-like housing upper part 26. This is shown in FIG. 4.

Figure 4:
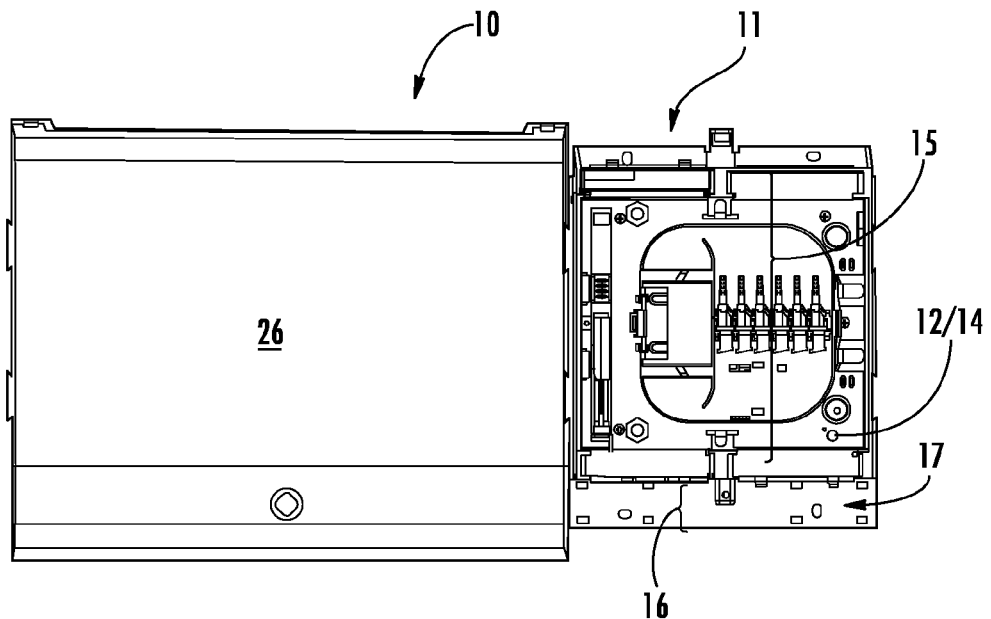
FIG. 4 shows the arrangement shown in FIG. 1 together with a housing upper part.

This common housing upper part for the first functional regions 15 and second functional regions 16 of the optical waveguide distribution devices 10 and 11 can in this case extend over a plurality of housing lower parts, which are positioned next to one another and/or one above the other, of a plurality of optical waveguide distribution devices, or, as is shown in FIG. 4, exclusively over one optical waveguide distribution device 10 or 11.

Preferred is a development of the invention in which individual cover-like housing upper parts are provided for the first functional regions 15 and the second functional regions 16 of the housing lower parts 14 of the housings 12 of each optical waveguide distribution device 10, 11 in order to individually cover or close the first functional regions 15 and second functional regions 16.

In this case, an individual housing upper part for a first functional region 15 can then extend over a plurality of first functional regions 15 of a plurality of optical waveguide distribution devices positioned next to one another and/or one above the other in order to close jointly a plurality of first functional regions 15 or to make a plurality of first functional regions 15 accessible jointly for service personnel and fitters. The individual housing upper parts for the second functional regions 16 can likewise extend over a plurality of second functional regions 16 of a plurality of optical waveguide distribution devices positioned next to one another and/or one above the other in order also to make the cable guide channels 17 defined by the second functional regions 16 accessible jointly to service personnel.

The invention is not restricted to the preferred application of optical waveguide distribution devices. Instead the invention can also be used for other distribution devices for handling other data conductors than optical waveguides, for example for handling copper conductors.

We claim:

1. A system of distribution devices for handling data conductors or junctions between data conductors, the system, comprising:
 a plurality of distribution devices, wherein each distribution device comprises,
  a housing having assemblies for connecting and/or storing data conductors, and
  at least two physically and functionally separate functional regions in the housing, wherein a first functional region provides for at least one or more of connecting and storing data conductors, and wherein a second functional region provides exclusively for guiding data cables having the data conductors;
 wherein the second functional region of one of the plurality of the distribution devices positions next to the second functional region of another one of the plurality of distribution devices, and wherein the second functional regions define a continuous cable guide channel which extends over the distribution devices positioned next to one another, in order to transfer data cables between the distribution devices in the horizontal direction and in a manner physically separated from the first functional regions of the plurality of distribution devices.

2. The system of claim 1, wherein the plurality of the distribution devices are positioned one above the other, and wherein the second functional regions of the plurality of the distribution devices define a continuous cable guide channel which extends over the plurality of the distribution devices positioned one above the other, in order to transfer data cables between the plurality of the distribution devices positioned one above the other in the vertical direction and in a manner physically separate from the first functional regions.

3. The system of claim 1, wherein the plurality of the distribution devices are positioned next to each other, and wherein the first functional regions of the plurality of distribution devices are separated from one another by adjoining side walls of the housings.

4. The system of claim 1, wherein the plurality of the distribution devices are positioned one above the other, and wherein the first functional regions of the plurality of the distribution devices are separated from one another by adjoining side walls of the housings.

5. The system of claim 1, wherein the first functional region and the second functional region of the housing of each distribution device of the plurality of distribution devices are separated from one another by a side wall of a housing lower part of the respective housing, and wherein the side walls of the housing lower part of each distribution device of the plurality of distribution devices have at least one aperture for transferring the data cables having the data conductors between the two functional regions.

6. The system of claim 1, wherein the first functional region and the second functional region of the housing of each distribution device of the plurality of distribution devices are closed or covered by a common cover-like housing upper part.

7. The system of claim 6, wherein the common housing upper part extends over housing lower parts of a plurality of distribution devices positioned at least one of next to one another and one above the other.

8. The system of claim 1, wherein the first functional region and the second functional region of the housing of each distribution device of the plurality of distribution devices are closed or covered by an individual cover-like housing upper part.

9. A system of claim 8, wherein the individual housing upper part for the first functional region extends over a plurality of first functional regions of the plurality of distribution devices positioned at least one of next to one another and one above the other.

10. The system of claim 8, wherein the individual housing upper part for the second functional region extends over a plurality of second functional regions of a plurality of distribution devices positioned at least one of next to one another and one above the other.

11. A system of distribution devices for handling data conductors or junctions between data conductors, the system, comprising:
 a plurality of distribution devices, wherein each distribution device comprises,
  a housing having assemblies for connecting and/or storing data conductors, and
  at least two physically and functionally separate functional regions in the housing, wherein a first functional region provides for at least one or more of connecting and storing data conductors, and wherein a second functional region provides exclusively for guiding data cables having the data conductors;

wherein the first functional region and the second functional region of the housing of each distribution device of the plurality of distribution devices are closed or covered by a common cover-like housing upper part; and wherein the common housing upper part extends over housing lower parts of a plurality of distribution devices positioned at least one of next to one another and one above the other.

12. A system of distribution devices for handling data conductors or junctions between data conductors, the system, comprising:

a plurality of distribution devices, wherein each distribution device comprises, a housing having assemblies for connecting and/or storing data conductors, and at least two physically and functionally separate functional regions in the housing, wherein a first functional region provides for at least one or more of connecting and storing data conductors, and wherein a second functional region provides exclusively for guiding data cables having the data conductors;

wherein the first functional region and the second functional region of the housing of each distribution device of the plurality of distribution devices are closed or covered by an individual cover-like housing upper part wherein the individual housing upper part for one of the first functional region and the second functional region extends over a plurality of functional regions of the plurality of distribution devices positioned at least one of next to one another and one above the other.

* * * * *